Aug. 20, 1968   J. BAILEY   3,398,145
DYES FOR PHOTOGRAPHIC FILTER AND ANTIHALATION LAYERS
Original Filed July 10, 1961

FIG. 1

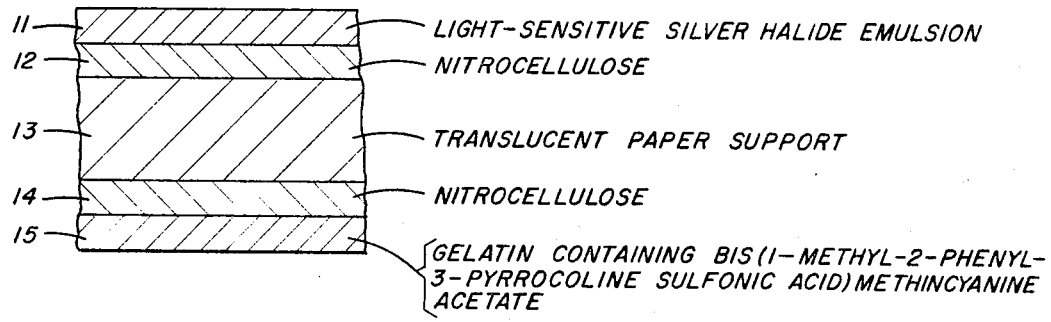

- 11 — LIGHT-SENSITIVE SILVER HALIDE EMULSION
- 12 — NITROCELLULOSE
- 13 — TRANSLUCENT PAPER SUPPORT
- 14 — NITROCELLULOSE
- 15 — GELATIN CONTAINING BIS(1-METHYL-2-PHENYL-3-PYRROCOLINE SULFONIC ACID)METHINCYANINE ACETATE

FIG. 2

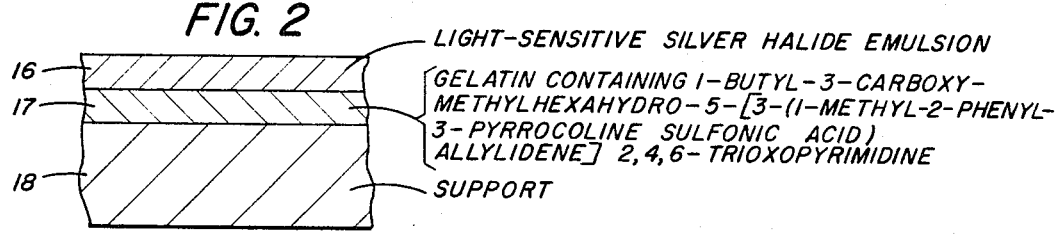

- 16 — LIGHT-SENSITIVE SILVER HALIDE EMULSION
- 17 — GELATIN CONTAINING 1-BUTYL-3-CARBOXYMETHYLHEXAHYDRO-5-[3-(1-METHYL-2-PHENYL-3-PYRROCOLINE SULFONIC ACID) ALLYLIDENE] 2,4,6-TRIOXOPYRIMIDINE
- 18 — SUPPORT

JOSEPH BAILEY
INVENTOR.

BY R. Frank Smith

Ray Carter Livermore
ATTORNEY & AGENT

United States Patent Office 3,398,145
Patented Aug. 20, 1968

3,398,145
DYES FOR PHOTOGRAPHIC FILTER AND
ANTIHALATION LAYERS
Joseph Bailey, Wealdstone, Harrow, Middlesex, England, assignor to Eastman Kodak Company, Rochester, N.Y., a corporation of New Jersey
Original application July 10, 1961, Ser. No. 122,852, now Patent No. 3,260,601, dated July 12, 1966. Divided and this application Aug. 27, 1965, Ser. No. 509,656
1 Claim. (Cl. 260—240.4)

ABSTRACT OF THE DISCLOSURE

Dyes derived from a substituted 3-pyrrocoline are useful dyes for photographic filter and antihalation layers. The 3-pyrrocoline compound is joined through a conjugated chain which joins the nitrogen atom of the pyrrocoline nucleus with a nitrogen atom or an oxygen atom of an indolenine nucleus, a benzoxazole nucleus, an indandione nucleus, an oxazolone nucleus, a pyrazolone nucleus, a barbituric acid nucleus, a thiobarbituric acid nucleus, a pyrrole nucleus and an indole nucleus, for example. The dyes have good spectral absorption properties and good bleaching characteristics, for example, and are readily incorporated in the colloidal material, such as gelatin, used to coat the layers. 1-butyl-3-carboxymethyl-hexahydro - 5 - [3 - (1 - methyl - 2 - phenyl - 3 - pyrrocolinyl sulfonic acid)allylidene]2,4,6-trioxopyrimidine and (1,2-diphenyl-3-pyrrocoline)(3-ethyl-2-benzoxazole) dimethincyanine iodide, for example, are illustrative of the dye compounds.

---

This is a division of U.S. patent application Ser. No. 122,852, Dyes for Photographic Filter and Anti-Halation Layers, filed July 10, 1961 now U.S. Patent 3,260,601.

This invention relates to novel dyes for photographic filter and antihalation layers and particularly to dyes derived from substituted 3-pyrrocolines and to filter and antihalation layers containing these dyes.

In the preparation of sensitive photographic elements, it is frequently desirable to incorporate one or more layers of colloidal material containing dyes or other coloring material. These layers may fulfill any of a number of purposes, such as the reduction of halation or filtration of certain undesirable rays from the exposing radiation, either upon direct exposure in a camera or other exposing device or for re-exposure in a photographic reversal process. Antihalation layers may be coated as a backing layer on either side of a transparent support carrying the light-sensitive emulsion or emulsions. Light-filtering layers may be coated over the light-sensitive emulsion layers or between such layers in multilayer elements.

The dyes used for such layers must have the desired spectral absorption characteristics. They should be easily incorporated in a water-permeable hydrophilic colloidal layer and yet firmly held in the layer so that they do not diffuse from it either during the manufacture of the element or on storing it. It is generally necessary to employ light-filtering dyes which can be quickly and readily rendered ineffective, i.e., decolorized or destroyed and removed prior to or during or after photographic processing. For many purposes it is particularly convenient to employ dyes which are rendered ineffective by one of the photographic baths used in processing the exposed element, such as a photographic developer or fixer. The decoloration or destruction of the light-screening dye will hereinafter be referred to as bleaching.

Prior art dyes known before which have desirable absorption characteristics have not always had good bleaching characteristics and pictures made from photographic elements containing them have been subject to undesirable stains. Other dyes have not had the stability in aqueous gelatin that is desired.

It is, therefore, an object of my invention to provide a new class of dyes derived from sulfonated 3-pyrrocolines for use in light-filtering layers and antihalation layers in photographic elements. A further object is to provide a new class of dyes which have (1) improved spectral absorption properties, (2) good bleaching characteristics and (3) are dyes which may be readily incorporated in the colloidal material used to coat the layers. Another object is to provide a new class of dyes which combines the above-mentioned desirable characteristics with good stability in aqueous gelatin. Still another object is to provide novel light-filtering layers containing my dyes. Another object is to provide novel antihalation layers containing my dyes. Other objects will become apparent from the following specification and claim.

These and other objects are accomplished by use of the dyes of my invention which are derived from substituted 3-pyrrocolines and may be represented by the formula:

I 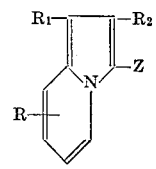

in which R represents a hydrogen atom, a lower alkyl group (sulfonated or not), such as methyl, sulfoethyl, sulfopropyl, propyl, sulfobutyl, etc., a lower alkoxy group, such as methoxy, ethoxy, propoxy, butoxy, etc., a benzene ring which may be fused to the pyridine ring of the pyrrocoline group, etc.; $R_1$ and $R_2$ each can represent an alkyl group (sulfonated or not), such as methyl, sulfomethyl, ethyl, propyl, isopropyl, sulfopropyl, n-butyl, sulfobutyl, etc., an aryl group (sulfonated or not), such as phenyl, 4-sulfophenyl, 4-tolyl, 2-sulfo-4-tolyl, 5-methoxyphenyl, 4-acetamidophenyl, etc., an arylalkyl group (sulfonated or not), such as phenylmethyl, phenylethyl, phenylpropyl, 4 - sulfophenylethyl, 2 - sulfophenylpropyl, etc.; and Z is a group of atoms which together with the nitrogen of the pyrrocoline nucleus completes a conjugated chain and terminates in another nitrogen atom or in an oxygen atom. All of these dyes may have in the molecule one or more sulfonic acid substituents and may also have one or more carboxyl groups. The nucleus known as pyrrocoline is also known as indolizine.

The dyes of the present invention include those having the following formulae:

II 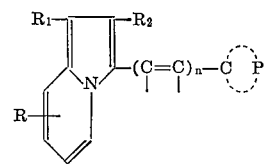

where R, $R_1$ and $R_2$ are as defined above, $n$ is a positive integer of from 1 to 2 and P represents the atoms necessary to complete a heterocyclic nucleus of weak basicity, such as an indolenine group, a benzoxazole group, etc., and the carbon atoms of the methine chain may each carry a hydrogen atom, a lower alkyl group, a lower alkoxy group, etc.;

III 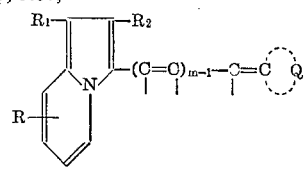

where R, $R_1$ and $R_2$ are as defined above, $m$ is an integer of from 1 to 3 and I represents the atoms necessary to complete (1) a heterocyclic nucleus of high acidity, such as an indandione group, an isoxazolone group, a pyrazolone group, e.g., 1-phenylpyrazolone, 3-carboxy-1-phenylpyrazolone, etc., a barbituric acid group, e.g., 2,4,6-trioxohexahydropyrimidine, 1 - butyl-3-,carboxymethylhexahydro - 2,4,6 - trioxopyrimidine, 1,3-diethyl-2,4,6-trioxohexahydropyrimidine, etc., a thiobarbituric acid group, e.g., 1,3-diethyl-4,6-dioxo-2-thiohexahydropyrimidine, 1-butyl-3-carboxymethyl-4,6-dioxo - 2-thiohexahydropyrimidine, 4,6-dioxo-2-thiohexahydropyrimidine, etc., or (2) a heterocyclic nucleus of weak basicity, such as a pyrrole group, e.g., 1-ethyl-2,5-dimethyl-3-pyrrole, 1,2,5-trimethyl-3-pyrrole, 1-ethyl-3-pyrrole, etc., an indole group, e.g., 3-indolyl acetic acid, 3-methylindole, etc., a pyrrocoline group, e.g., pyrrocoline, and the pyrrocolines attached to Z of Formula I, and the carbon atoms of the methine chain may each carry a hydrogen atom, a lower alkyl group, a lower alkoxy group, etc.:

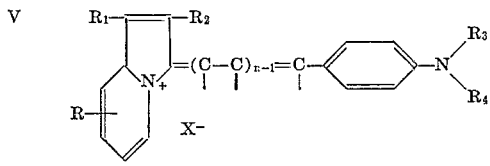

where R, $R_1$ and $R_2$ are as defined above, $R_3$ and $R_4$ each may represent a hydrogen atom, an alkyl group, such as methyl, ethyl, propyl, etc., an aryl group, such as phenyl, tolyl, etc., $n$ is an integer of from 1 to 2, $X^-$ represents any anion commonly used, such as iodide, bromide, chloride, nitrate, acetate, methylsulfate, p-toluenesulfonate, perchlorate, etc., and the carbon atoms of the methine chain may each carry a hydrogen atom, a lower alkyl group, a lower alkoxy group, etc.:

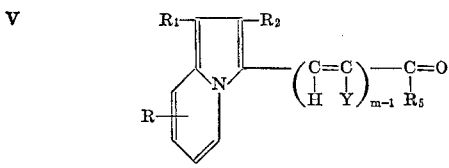

where R, $R_1$ and $R_2$ are each as defined above; $R_5$ is an alkyl group, such as methyl, ethyl, propyl, etc., an alkoxy group, such as methoxy, ethoxy, propoxy, etc.; Y is a hydrogen atom, or when Y is attached to the carbon atom adjacent the CO group it may be a cyano group, an ester grouping, such as an alkoxycarbamyl group in which the alkyl group has from 1 to 4 carbon atoms, an aryloxycarbamyl group, or an acid grouping, such as a carboxyl group, a sulfonic acid group, etc., and $m$ is an integer of from 2 to 3.

One method of preparing my dyes is by condensing the substituted pyrrocoline intermediate (sulfonated or not) with a derivative of the Z group, such as 2,2'-acetanilidovinylbenzoxazole ethiodide, 1-butyl-3-carboxymethyl-5,3'-ethoxyallylidenehexahydro-2,4,6-trioxopyrimidine, 1-phenylpyrazol-4-aldehyde, 3-formyl-1-ethyl-2,5-dimethylpyrrole, p-dimethylaminobenzaldehyde, etc. In making sulfonated or carboxylated dyes, it is preferable to add these groups to the dye intermediates before condensing them.

My dyes are characterized by their good spectral absorption properties, their good stability in aqueous solutions, and their good bleaching qualities. The spectral absorption characteristics are surprisingly different from prior art dyes. For example, my dyes are deeper in color than corresponding prior art dyes. The prior art dye 1-p-dimethylaminocinnamylidene - 2,3-diphenylpyrrocolinium perchlorate, for example, has a $\lambda_{max}$ value of 680 m$\mu$ while the corresponding dye of my invention, 3-p-dimethylaminocinnamylidene-1,2-diphenylpyrrocolinium iodide, has a $\lambda_{max}$ value of 640 m$\mu$ and a $\lambda_{max}$ of 720 m$\mu$. This unexpected shift in absorption maximum is a valuable property of my dye. The dyes are readily incorporated in water-permeable hydrophilic layers used in photographic elements because of their solubility in water or organic solvents which are commonly used, such as methanol, ethanol, pyridine, etc. The dyes may be mordanted with basic mordants where desired.

My dyes are valuable for use in photographic light-sensitive materials employing one or more sensitive silver halide layers. The dyes can be used to make light-screening layers including antihalation layers with or without dyes of other classes and can be incorporated readily in colloidal binders used for forming such layers. They are especially useful in gelatin layers lying adjacent to silver halide layers, since the dyes can be mordanted with organic polymeric substances to form excellent nonwandering characteristics in gelatin while the dyes can be readily bleached without the need for removing the layers containing them. Bleaching of the dyes occurs when the layer is treated with alkaline solutions containing sodium sulfite, such as photographic developing solutions.

My dyes can be mordanted in layers coated in contact with light-sensitive silver halide emulsion layers since the mordanted dyes have very good stability at the pH of most sensitive silver halide emulsions (about 6.3) and have little or no undesirable effect on the silver halide. Consequently, the dyes may be used as light-screening dyes in layers coated directly on top of sensitive silver halide emulsion layers or between two sensitive silver halide emulsion layers or between the support and a sensitive silver halide emulsion layer or on the back of the support as an antihalation layer.

Representative dyes of my invention and their preparation are illustrated by the following examples which are not intended to limit my invention.

DYE 1

(3-ethyl-2-benzoxazole)(1-methyl-2-phenyl-3-pyrrocoline sulfonic acid)dimethylincyannine iodide

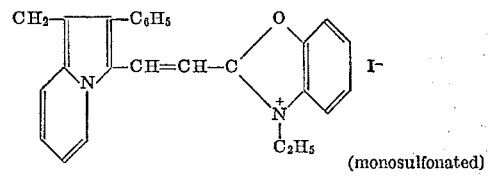

(monosulfonated)

1-methyl-2-phenylpyrrocoline sulfonic acid (ammonium salt) (1.5 grams), 2,2'-acetanilidovinylbenzoxazole ethiodide (2.2 grams) and acetic acid (20 ccs.) were heated under reflux for 10 minutes. The reaction mixture was chilled and the dye collected and washed with acetic acid. The product weighed 2.5 grams; M.P. >300° C. It had a spectral absorption maximum in ethanol at 544 m$\mu$.

$C_{26}H_{22}N_4O_4S$ requires 6.1% N, 7.0% S; analysis gave 5.95% N, 7.1% C.

DYE 2

(1,2 - diphenyl-3-pyrrocoline)(3-ethyl-2-benzoxazole)-dimethincyanine iodide

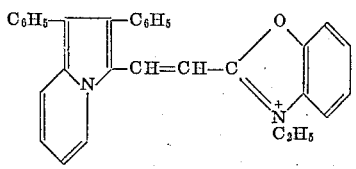

prepared analogously to Dye 1 using the appropriate intermediates. The dye had an absorption maximum in methanol at 540 m$\mu$.

$C_{31}H_{25}N_2OI$ requires 4.9% N; analysis gave 4.7% N. M.P.=212° C.

DYE 3

(4,5 - diphenyl -3- ethyl-2-oxazole)(1,2-diphenyl-3-pyrrocoline)dimethincyanine p-toluenesulfonate

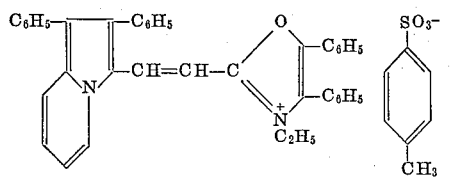

prepared analogously to Dye 1 using the appropriate intermediates. The dye had an absorption maximum in methanol at 525 mμ.

$C_{46}H_{38}N_2O_4S$ requires 3.9% N; analysis gave 3.8% N. M.P.=248° C.

DYE 4

(1,2 - diphenyl-3-pyrrocoline)(1,3,3-trimethyl-2-indolenine)dimethincyanine iodide

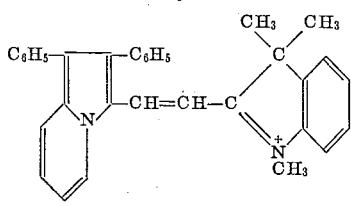

prepared analogously to Dye 1 using the appropriate intermediates. The dye had an absorption maximum in methanol at 577 mμ.

$C_{33}H_{29}N_2I$ requires 4.8% N; analysis gave 4.75 % N. M. P. 242° C.

DYE 5 bis(1-methyl-2-phenyl-3-pyrrocoline sulfonic acid)methincyanine acetate

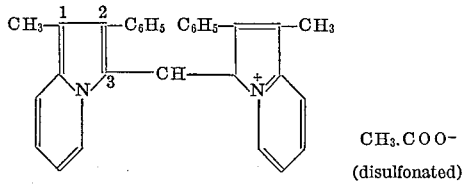

1-methyl-2-phenylpyrrocoline sulfonic acid (ammonium salt) (3 grams), ethyl orthoformate (3 ccs.), acetic acid (20 ccs.) were heated under reflux for 5 minutes. The reaction mixture was chilled and the dye precipitated by the addition of ether. It was collected and washed with ether and dried at 60° C. for 3 hours. The product weighed 3 grams. It was readily soluble in water and had an absorption maximum at 646 mμ.

$C_{33}H_{28}N_2O_8S_2$ requires 9.9% S; analysis gave 9.5% S. M.P. >300° C.

DYE 6

1 - butyl - 3 - carboxymethylhexahydro - 5[3-(1-methyl-2-phenyl-3-pyrrocolinyl sulfonic acid)-allylidene]2,4,6-trioxopyrimidine

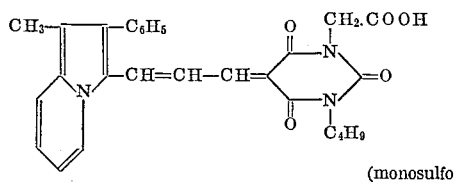

(monosulfonated)

1-methyl-2-phenylpyrrocoline sulfonic acid (ammonium salt) (1.5 grams), 1-butyl-3-carboxymethyl-5-3'-ethoxyallylidene-hexahydro-2,4,6-trioxopyrimidine (1.6 grams), acetic acid (20 ccs.) were heated under reflux for 10 minutes. After chilling, the dye, which separated, was collected and washed with acetic acid. The yield of dye was 3 grams. It was soluble in water with an absorption maximum at 593 mμ.

$C_{28}H_{27}N_3O_8S$ requires 7.4% N, 5.7% S; analysis gave 7.9% N, 5.2% S; M.P. 241° C.

DYE 7

5 - [3-(1-methyl-2-phenyl-3-pyrrocolinyl)-allylidene]-1,3-diethyl-4,6-dioxo-2-thiohexahydropyrimidine

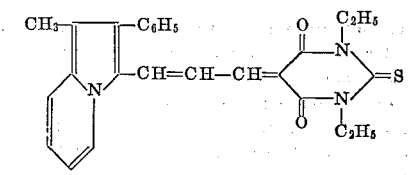

1-methyl-2-phenylpyrrocoline (1 gram), 1,3-diethyl-4,6-dioxo - 5-(3-ethoxyallylidene)-2-thiohexahydropyrimidine (1.4 grams) were refluxed in acetic acid (20 ccs.) for 5 minutes. The reaction mixture was chilled and the dye was collected and washed with acetic acid. It was treated with boiling methanol (200 ccs.) and after chilling was refiltered and washed with methanol. The yield of green crystals was 2 grams. The dye had an absorption maximum in methanol at 610 mμ.

$C_{26}H_{25}N_3O_2S$ requires 9.5% N, 7.22% S; analysis gave 9.1% N, 7.6% S; M.P. 254° C.

DYE 8

1 - methyl-2-phenyl-3(1'-phenyl-4'-pyrazolyl)-methylenepyrrocolinium bisulfate

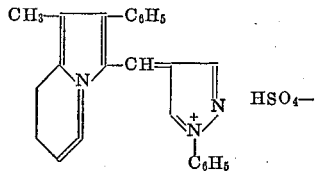

1-methyl-2-phenylpyrrocoline (2.07 grams), 1-phenylpyrazole-4-aldehyde (1.72 grams) suspended in ethanol (20 ccs.), on addition of conc. $H_2SO_4$ (1 cc.) in ethanol (10 ccs.) all the solid went into solution and the dye product immediately began to separate. The reaction mixture was cooled and the dye collected and washed with ethanol (30 ccs.). The yield of dye was 4.5 grams. It had an absorption maximum in water at 440 mμ.

$C_{25}H_{21}N_3O_4S$ requires 9.1% N, 6.95% S; analysis gave 8.6% N, 7.0% S; M.P. 254° C.

DYE 9

5-[3-(1-methyl-2-phenyl-3-pyrrocolinyl sulfonic acid)allylidene] - 1,3 - diethyl - 4,6 - dioxo - 2 - thiohexahydropyrimidine

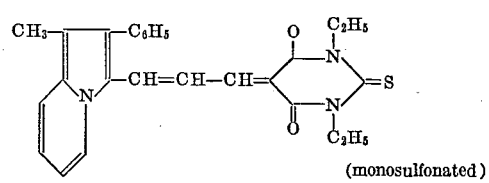

(monosulfonated)

This was prepared in a similar way to Dye 7 using a proportional amount of 1-methyl-2-phenylpyrrocoline sulfonic acid instead of 1-methyl-2-phenylpyrrocoline. The dye had an absorption maximum in 50% aqueous ethanol at 617 mμ.

$C_{26}H_{25}N_3O_5S_2$ requires 8.0% N, 12.2% S; analysis gave 8.4% N, 11.8% S; M.P. >300° C.

DYE 10

(1-ethyl - 2,5 - dimethyl-3-pyrrole) (1-methyl-2-phenyl-3-pyrrocoline sulfonic acid)methincyanine acetate

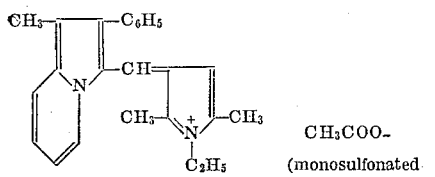

CH₃COO⁻
(monosulfonated)

1-methyl-2-phenylpyrrocoline sulfonic acid (ammonium salt) (3 grams), 3-formyl-1-ethyl-2,5-dimethylpyrrole (1.5 grams), acetic acid (20 ccs.) were heated to reflux for one minute. The reaction mixture was chilled, the dye was collected and washed with acetic acid. It weighed 3.5 grams and had an absorption maximum in 50% aqueous ethanol at 530 mμ.

$C_{26}H_{28}N_2O_5S$ requires 5.8% N, 6.7% S; analysis gave 6.2% N, 6.7% S; M.P. 247° C.

DYE 11

3-carboxy-4[3-(1-methyl-2-phenyl-3-pyrrocolinyl sulfonic acid)allylidene]-1-phenyl-pyrazol-5-one

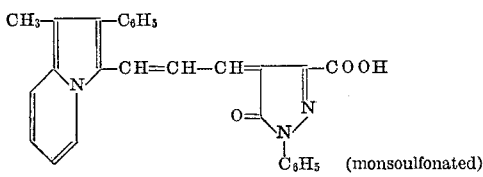

(monosoulfonated)

The dye was prepared in a similar way to Dye 6 using a proportionate amount of 3-carboxy-4-3'-ethoxyallylidene-1-phenylpyrazol-5-one instead of 1-butyl-3-carboxymethyl-5-3'-ethoxyallylidenehexahydro - 2,4,6-trioxo-pyrimidine. The dye had an absorption maximum in ethanol at 623 mμ.

$C_{28}H_{21}N_3O_6S$ requires 8.0% N, 6.1% S; analysis gave 8.5% N, 5.9% S; M.P. 263° C.

DYE 12

Anhydro bis(1-methyl-2-p-sulfophenyl-3-pyrrocoline)trimethincyanine hydroxide

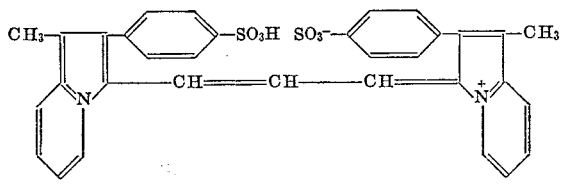

1-methyl-2-p-sulfophenylpyrrocoline (ammonium salt) (3 g.), β-ethoxyacrolein acetal (3 cc.) in acetic anhydride (20 cc.) were heated on the steam-bath for 15 minutes with hand stirring. The mixture was cooled and diluted with an equal volume of methanol and then with water (100 cc.). On treatment with a little concentrated hydrochloric acid, the product precipitated. It was collected by filtration and suspended in water (100 cc.) and refiltered and dried. The product weighed 1 g. It had an absorption maximum in 50% aqueous ethanol at 697 mμ.

$C_{33}H_{25}N_2O_6S_2$ requires 4.6% N, 10.5% S; analysis gave 4.1% N, 10.1% S; M.P.>300° C.

DYE 13

Bis(1-methyl-2-phenyl-3-pyrrocoline)trimethincyanine chloride

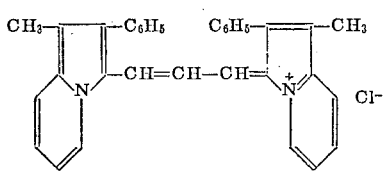

1-methyl-2-phenylpyrrocoline (4.2 g.), β-ethoxyacrolein acetal (3 cc.) in ethanol (30 cc.) were treated with concentrated hydrochloric acid (3 cc.) and gently warmed on the steambath for 2 minutes. The reaction mixture was chilled and the separated dye was collected and recrystallized from ethanol as tiny bronze plates. The yield of dye was 3.5 g. It had an absorption maximum in methanol at 694 mμ.

$C_{33}H_{27}ClN_2$ requires 7.3% Cl, 5.7% N; analysis gave 7.35% Cl, 5.2% N; M.P. 130° C.

DYE 14

1,3-diethyl-hexahydro-5-(1-methyl-2-phenyl-7,8-benzopyrrocol-3-yl)methylene-2,4,6-trioxo pyrimidine

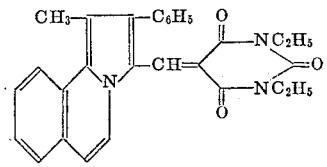

1-methyl-2-phenyl-7,8-benzopyrrocoline (1 g.), 1,3-diethyl-5-ethoxymethylenebarbituric acid (1 g.) in acetic acid (20 cc.) were heated under reflux for 20 minutes. Red needles separated. The reaction mixture was chilled, collected and washed with methanol and dried. The yield of dye was 1.5 g. It had an absorption maximum in chloroform at 518 mμ.

$C_{28}H_{25}N_3O_3$ requires 9.3% N; analysis gave 9.8% N. M.P. 250° C.

DYE 15

3-p-dimethylaminobenzylidene-1-methyl-2-phenyl pyrrocolinium sulfonic acid acetate

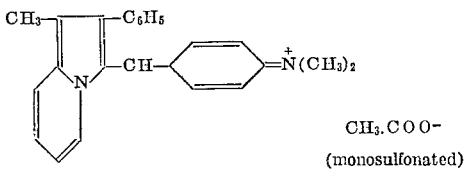

CH₃.COO⁻
(monosulfonated)

1-methyl-2-phenylpyrrocoline sulfonic acid (ammonium salt) (1.5 grams), p-dimethylaminobenzaldehyde (0.75 gram) and acetic acid (20 ccs.) were heated under reflux for 5 minutes. On chilling, the dye separated as green needles which were collected and washed with acetic acid. The yield of dye was 2 grams. It had an absorption maximum in 50% aqueous ethanol at 610 mμ.

$C_{26}H_{26}N_2O_5S$ requires 5.9% N, 6.7% S; analysis gave 6.1% N, 6.7% S; M.P. >300° C.

DYE 16

3-p-dimethylaminobenzylidene-2-p-methoxyphenyl-1-methylpyrrocolinium perchlorate

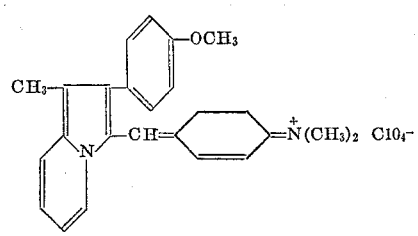

prepared similarly to Dye 15. The dye was precipitated as the perchlorate by pouring the reaction mixture into a water solution of sodium perchlorate. The dye had an absorption maximum in methanol at 598 mμ.

$C_{25}H_{25}ClN_2O_5$ requires 6.0% N; analysis gave 6.1% N. M.P. 209° C.

DYE 17

2-p-acetamidophenyl-3-p-dimethylaminocinnamylidene-1-methylpyrrocolinium perchlorate

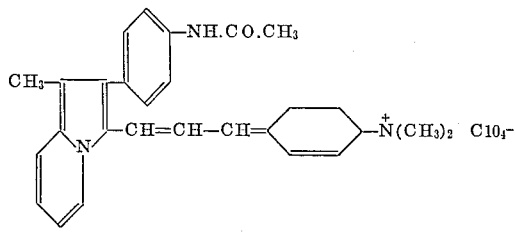

prepared similarly to Dye 15 using p-dimethylaminocinnamic aldehyde and 1-methyl-2-p-acetamidophenylpyrrocoline. The dye was recrystallized from methanol-ether mixture. It had an absorption maximum in methanol at 666 m$\mu$.

$C_{28}H_{28}ClN_3O_5$ requires 8.1% N; analysis gave 8.3% N. M.P. 214° C.

The intermediates used were prepared as follows:

1-METHYL-2-PHENYLPYRROCOLINE SULFONIC ACID 1-methyl-2-phenylpyrrocoline (4.2 grams) was treated with concentrated sulfuric acid (12 ccs.) and 20% oleum (9 ccs.). The mixture was heated on a steam bath for 2 hours. It was then chilled and poured into water (300 ccs.). The resulting solution was basified with ammonium hydroxide. The solid product which precipitated was collected and recrystallized from boiling water. The pure product was collected, drained as much as possible on the filter and then suspended in ethanol (50 ccs.), refiltered and finally washed with ethanol. The dried product weighed 3.7 grams. A sample on analysis gave 58.95% C, 5.3% H, 9.05% N, 10.9% S. The ammonium salt of $C_{15}H_{13}NO_3S$ requires 59.1% C, 5.25% H, 9.2% N, 10.5% S.

1-METHYL-2-PHENYLPYRROCOLINE 2-ethylpyridine (10.7 grams) phenacyl bromide (19.9 grams) in acetone (20 ccs.) were heated under reflux for 15 minutes, after which time solid 2-ethyl-1-phenacyl-pyridinium bromide separated. After chilling it was collected and washed with acetone. It (20 grams) was added to water (500 ccs.) containing sodium bicarbonate (18 grams), heated to boiling and held at the boiling point for 10 minutes during which time an oil separated. On chilling, the oil solidified. The product was collected, washed with water and recrystallized from methanol. It (12 grams) was obtained as tiny colourless needles M.P. 85° C. Sample on analysis gave 86.3% C, 6.45% H, 6.85% N. $C_{15}H_{13}N$ requires 86.9% C, 6.3% H, 6.75% N.

Other examples of the intermediates used were prepared by the synthesis used to make 1-methyl-2-phenylpyrrocoline using the appropriate starting materials. The analysis and melting point data found for these intermediates follow:

1,2-DIPHENYLPYRROCOLINE

*Analysis.*—$C_{20}H_{15}N$, percent: Calc.—C, 89.2; H, 5.6; N, 5.2. Found—C, 89.3; H, 5.7; N, 5.1. M.P. 113° C.

1-METHYL-2-PHENYL-7,8-BENZOPYRROCOLINE

*Analysis.*—$C_{19}H_{15}N$, percent: Calc.—C, 88.7; H, 5.8; N, 5.4. Found—C, 88.3; H, 6.1; N, 5.5. M.P. 119° C.

1-METHYL-2-p-METHOXYPHENYLPYRROCOLINE

*Analysis.*—$C_{16}H_{15}NO$, percent: Calc.—C, 81; H, 6.3; N, 5.9. Found—C, 81; H, 6.55; N, 5.9. M.P. 97° C.

1-METHYL-2-p-ACETAMIDOPHENYLPYRROCOLINE

*Analysis.*—$C_{16}H_{16}N_2O$, percent: Calc.—C, 76.2; H, 6.3; N, 11.1. Found—C, 76.6; H, 6.3; N, 11.0. M.P. 182° C. (with darkening at 176° C.).

The light-screening layers of my invention are prepared by coating on the photographic element or on its support, by methods well known in the art, a water solution of the dye, a hydrophilic colloid binder and a coating aid such as saponin. In addition to these materials it is advantageous to add a basic mordant to this solution to render the acid dye nonwandering. For most purposes it is desirable to add agents to harden the colloidal binder material so that the light-screening layer will remain intact in the photographic element during and following the processing operation. The pH of the coating solution is adjusted when necessary to a level that is compatible with the light-sensitive emulsion layer by the usual methods.

The proportions of dye, colloidal binder, mordant, hardener, coating aid used in making my light-screening layers may be varied over wide ranges and will depend upon the specific requirements of the photographic element being produced. The methods used to determine the optimum compoistion are well known in the art and need not be described here.

The light-sensitive layer or layers and the light-screening layer or layers of the photographic element may be coated on any suitable support material used in photography such as cellulose nitrate, cellulose acetate, synthetic resin, paper, etc.

Hydrophilic colloidal materials used as binders include collodion, gum arabic, cellulose ester derivatives such as alkyl esters of carboxylated cellulose, hydroxy ethyl cellulose, carboxy methyl cellulose, carboxy methyl hydroxy ethyl cellulose, synthetic resins, such as the amphoteric copolymers described by Clavier et al. in U.S. Patent 2,949,442, issued Aug. 16, 1960, polyvinyl alcohol, and others well known in the art. The above-mentioned amphoteric copolymers are made by polymerizing the monomer having the formula:

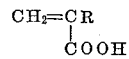

wherein R represents an atom of hydrogen or a methyl group, and a salt of a compound having the general formula:

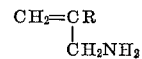

wherein R has the above-mentioned meaning, such as an allylamine salt. These monomers can further be polymerized with a third unsaturated monomer in an amount of 0 to 20% of the total monomer used, such as an ethylene monomer that is copolymerizable with the two principal monomers. The third monomer may contain neither a basic group nor an acid group and may, for example, be vinyl acetate, vinyl chloride, acrylonitrile, methacrylonitrile, styrene, acrylates, methacrylates, acrylamide, methacrylamide, etc. Examples of these polymeric gelatin substitutes are copolymers of allylamine and methacrylic acid; copolymers of allylamine, acrylic acid and acrylamide; hydrolyzed copolymers of allylamine, methacrylic acid and vinyl acetate; copolymers of allylamine, acrylic acid and styrene; the copolymer of allylamine, methacrylic acid and acrylonitrile; etc.

My dyes are generally added to the water-permeable colloidal binder in water solution. In some instances it may be advantageous to form an alkali metal salt of the dye by dissolving the dye in a dilute aqueous alkali metal carbonate solution, for example. Usually a coating aid, such as saponin, is added to the dyed colloidal suspension before coating it as a layer on the photographic element. The dyes are advantageously mordanted with a suitable basic mordant added to the colloidal suspension before coating.

Basic mordants that may be used include the basic mordants described by Minsk in U.S. 2,882,156, issued Apr. 14, 1959, prepared by condensing a polyvinyl-oxo-compound such as a polyacrolein, a poly-$\gamma$-methylacrolein, a polyvinyl alkyl ketone, such as polyvinyl methyl ketone, polyvinyl ethyl ketone, polyvinyl propyl ketone, polyvinyl butyl ketone, etc., or certain copolymers containing acrolein, methacrolein, or said vinyl alkyl ketone components, for example, 1 to 1 molar ratio copolymers of those components with styrene or alkyl methacrylates wherein the alkyl group contains from 1 to 4 carbon atoms, such as methyl, ethyl, propyl, or butyl methacrylates in the proportions from about .25 to 5 parts by weight of the said polymeric oxo-compound with one part by weight of an aminoguanidine compound such as aminoguanidine bicarbonate, aminoguanidine acetate, aminoguanidine butyrate, etc.; the reaction products of polyvinylsulfonates with C-aminopyridines of Reynolds et al. U.S. 2,768,078, issued Oct. 23, 1956, prepared by reacting alkyl and aryl polyvinyl sulfonates prepared as described in our patents U.S. 2,531,468 and U.S. 2,531,469 both dated Nov. 28, 1950, under controlled conditions with C-aminopyridines or alkyl group substituted C-aminopyridines such as 2-aminopyridine, 4-aminopyridine, the aminopicolines such as 2-amino-3-methylpyridine, 2-amino-4-methylpyridine, 2-amino-5-methylpyridine, 2-amino-6-methylpyridine and corresponding 4-aminomethyl derivatives which react in this reaction in exactly the same way, 2-amino-6-ethylpyridine, 2-amino-6-butylpyridine, 2-amino-6-amylpyridine, etc., the various aminolutidines such as, for example, 4-amino-2,6-dimethylpyridine and the various aminocollidines such as, for example, 2-amino-3-ethyl-4-methylpyridine, etc.; the dialkylaminoalkyl esters or dialkylaminoalkylamino amides, e.g., such as those described by Carroll et al., U.S. Patent 2,6675,316, issued Apr. 13, 1954, prepared by reacting addition polymers containing carboxyl groups with a basic dialkylamino compound, for example, N-dialkyl amine ethyl esters of polymers or copolymers containing carboxyl groups; the addition type polymers containing periodically occurring quaternary groups of Sprague et al., 2,675,316, issued Apr. 13, 1954, prepared by reacting ammonium salts of vinyl substituted azines such as vinylpyridine and its homologs such as vinylquinoline, vinylacridine, and vinyl derivatives of other six-membered heterocyclic ring compounds containing hydrogen atoms. These addition polymers include 2-vinylpyridine polymer metho-p-toluenesulfonate, 4-vinylpyridine polymer metho-p-toluensulfonate.

Hardening materials that may be used to advantage include such hardening agents as formaldehyde; a halogen-substituted aliphatic acid such as mucobromic acid as described in White, U.S. Patent 2,080,019, issued May 11, 1937; a compound having a plurality of acid anhydride groups such as 7,8 - diphenylbicyclo - (2,2,2)-7-octene-2,3,5,6-tetra-carboxylic dianhydride, or a dicarboxylic or a disulfonic acid chloride such as terephthaloyl chloride or naphthalene-1,5-disulfonyl chloride as described in Allen and Carroll, U.S. Patents 2,725,294 and 2,725,295, both issued Nov. 29, 1955; a cyclic 1,2-diketone such as cyclopentane-1,2-dione as described in Allen and Byers, U.S. Patent 2,725,305, issued Nov. 29, 1955; a bisester of methanesulfonic acid such as 1,2-di(methanesulfonoxy)-ethane as described in Allen and Laakso, U.S. Patent 2,726,162, issued Dec. 6, 1955; 1,3-dihydroxymethylbenzimidazol-2-one as described in July, Knott and Pollak, U.S. Patent 2,732,316, issued Jan. 24, 1956; a dialdehyde or a sodium bisulfite derivative thereof, the aldehyde groups of which are separated by 2–3 carbon atoms, such as β-methyl glutaraldehyde bis-sodium bisulfite as described in Allen and Burness, U.S. patent application Ser. No. 556,031, filed Dec. 29, 1955; a bis-aziridine carboxamide such as trimethylene bis(1-aziridine carboxamide) as described in Allen and Webster, U.S. Patent 2,950,197, issued Aug. 23, 1960; or 2,3-dihydroxydioxane as described in Jeffreys, U.S. Patent 2,870,013, issued Jan. 20, 1959.

The photographic element utilizing my light-screening layers have light-sensitive emulsion layers containing silver chloride, silver bromide, silver chlorobromide, silver iodide, silver bromoiodide, silver chlorobromoiodide, etc., as the light-sensitive material. Any light-sensitive silver halide emulsion layers may be used in these photographic elements. The silver halide emulsion may be sensitized by any of the sensitizers commonly used to produce the desired sensitometric characteristics.

My invention is further illustrated by the following examples describing the methods used to prepare light-filtering or antihalation layers for light-sensitive photographic elements.

EXAMPLE 1

Dye 5 was dissolved in a 6% aqueous-solution of gelatin and coated at the rate of 21 mg. of dye per square foot of conventional film support. The dye in samples of this coating was bleached when a sample was treated in photographic developing solutions, having the following formulae:

Developer A

| | G. |
|---|---|
| p-Methylaminophenol sulfate | 2.2 |
| Hydroquinone | 8.8 |
| Sodium sulfiite, anhydrous | 72.0 |
| Sodium carbonate, anhydrous | 48.0 |
| Potassium bromide | 4.0 |
| Water to 1.0 l. | |

Developer B

| | G. |
|---|---|
| p- Methylaminophenol sulfate | 1.0 |
| Sodium sulfite, desiccated | 75.0 |
| Hydroquinone | 9.0 |
| Sodium carbonate, monohydrate | 30.0 |
| Potassium bromide | 5.0 |
| Water to 1.0 l. | |

Developer C

| | G. |
|---|---|
| p-Methylaminophenol sulfate | 2.2 |
| Sodium sulfite, anhydrous | 75.0 |
| Hydroquinone | 17.0 |
| Sodium carbonate, anhydrous | 65.0 |
| Potassium bromide | 2.8 |
| Water to 1.0 l. | |

EXAMPLE 2

A solution of 10 mg. of Dye 5 in 5 cc. of methanol was added to 10 cc. of 10% gelatin in water, and the mixture was diluted with 30 cc. of water. A coating of this material on glass plates at 17 mg. of dye per square foot was chill-set and dried. This coating absorbed light from 550 to 750 mμ with a $D_{max}$ of 1.12 at 653 mμ.

A dispersion of 30 mg. of an aminoguanidine mordant, such as those described by Minsk, U.S. 2,882,156, in 4 cc. of 3% aqueous gelatin was added to 10 cc. of 10% gelatin adjusted to a pH of 4.5. To this, was added a solution of 10 mg. of the dye in 5 cc. of methanol, the solution was diluted to 30 cc. and the pH readjusted to 4.5. A coating of this material on a glass plate had the same absorption characteristics as the gelatin coating of the dye without the mordant.

The dye was readily bleached from both types of coating by a developing solution having the formula:

Developer D

| | G. |
|---|---|
| p-Methylaminophenol sulfate | 2.0 |
| Sodium sulfite, desiccated | 90.0 |
| Hydroquinone | 8.0 |
| Sodium carbonate, monohydrate | 52.5 |
| Potassium bromide | 5.0 |
| Water to make 1.0 l. | |

The dye was also bleached from both types of coating by a 10% aqueous sodium sulfite solution. The dye was easily washed with water from the plates containing gelatin alone but was held quite tightly in the mordanted coating.

EXAMPLE 3

Plate coatings containing Dye 6 were made as in Example 2 both with and without a mordant. The glass plate containing gelatin and dye at 17 mg. per square foot had a $D_{max}$ of 1.41 and 1.61 at 553 and 596 m$\mu$, respectively. The plate containing mordant had a $D_{max}$ of 1.59 and 1.44 at 550 and 596 m$\mu$, respectively. The unmordanted dye was bleached readily by Developer D and by 10% aqueous sodium sulfite, but the mordanted dye was only partially bleached. Dye 6, like Dye 5, was easily washed from the gelatin plates with water but was held quite tightly in the mordanted coating.

EXAMPLE 4

Onto a translucent paper base, standard type A 4 lacquered tracing paper (90 g. tracing paper, lacquered on both sides with nitrocellulose lacquer, to a weight of about 15 g. per square meter on each side, and subbed both sides—purchased from Felix Schoeller Germany), was coated an antihalation backing layer. This was prepared by adding the following dye solutions:

(A) 6.75 g. bis[1-p-sulfophenyl-3-methyl-5-pyrazolone-(4)]methinoxonol in 270 cc. water, (B) 7 g. acid fuchsin in 90 cc. of water, and (C) 0.75 g. of Dye 5 in 150 cc. of water to an aqueous gelatin solution having its pH adjusted to 6.5 to 6.8 and containing 200 g. of gelatin, 40 cc. of 10% chrome alum solution, 14 cc. of 20% formalin and 1 g. of saponin. The dyed gelatin solution was coated at the rate of 0.57 g. of gelatin per square foot and dried.

An orthosensitized silver chlorobromide emulsion was then coated on the other side of the support with a silver coverage of 13.7 grains of silver nitrate per square foot.

After exposure, development in Developer A, rinsing, fixing, and washing, the antihalation backing layer was completely decolorized.

Similarly, the antihalation backing was completely decolorized when Developers B, C, and D were employed in processing the exposed material.

Similarly, other dyes of my invention are incorporated in water-permeable hydrophilic colloid layers and coated on photographic elements as filter layers or as antihalation layers from which the dyes are readily bleached during processing in the photographic developer solutions normally used.

The accompanying drawing, which contains FIGS. 1 and 2 still further illustrates my invention. These figures represent greatly enlarged cross-sectional views of light-sensitive photographic elements containing my light-absorbing water-permeable colloid layer.

FIG. 1 shows the photographic element of Example 4, which consists of light-sensitive silver halide emulsion layer 11 coated on nitrocellulose layer 12, coated on translucent paper support 13, which is coated successively on the opposite side with nitrocellulose layer 14 and antihalation layer 15 consisting of gelatin containing bis(1-methyl-2-phenyl-3 - pyrrocoline sulfonic acid)methincyanine acetate.

FIG. 2 shows light-sensitive silver halide emulsion layer 16 coated over gelatin layer 17 containing 1-butyl-3 - carboxymethylhexahydro - 5-[3-(1-methyl-2-phenyl-3-pyrrocollinyl sulfonic acid)allylidene]2,4,6-trioxopyrimidine that is coated over support 18.

The dyes derived from 3-pyrrocolines are available for preparing light-filtering layers for light-sensitive photographic elements containing silver halide emulsion layers. The light-filtering layers containing my dyes are used to advantage, either over the light-sensitive silver halide emulsion layers, between the light-sensitive silver halide emulsion layer and the support, between two different light-sensitive layers, or as an antihalation backing layer. My dyes have maximum light absorption at desirable wave lengths. My dyes derived from 3-pyrrocoline are characterized from the corresponding dyes derived from 1-pyrrocoline by an unexpected shift in $\lambda_{max}$ values. For example, my dye, 3-p-dimethylaminocinnamylidene-1,2-diphenylpyrrocolinium iodide, has a $\lambda_{max}$ at 640 m$\mu$ and at 720 m$\mu$ compared to a $\lambda_{max}$ of 680 m$\mu$ for the corresponding dye derived from 1-pyrrocoline. They are further characterized by being readily mordanted with basic mordants so they will not wander into light-sensitive silver halide emulsion layers coated directly in contact with them and yet they are readily bleached in the light-filtering layer by conventional processing solutions which contain sodium sulfite. Furthermore, my mordanted dyes are characterized by having very good stability at the pH of most sensitive silver halide emulsions (about 6.3) and have little or no undesirable effect on the sensitivity of the silver halide emulsion layer when they are used in direct contact with them.

The invention has been described in detail with particular reference to preferred embodiments thereof but it will be understood that variations and modifications can be effected within the spirit and scope of the invention as described hereinabove and as defined in the appended claim.

I claim:

1. The light-absorbing dye 1-butyl-3-carboxymethylhexahydro - 5[3 - (1-methyl-2-phenyl-3-pyrroclinyl sulfonic acid)allylidene]2,4,6-trioxopyrimidine.

References Cited

UNITED STATES PATENTS

| | | | |
|---|---|---|---|
| 2,571,775 | 10/1951 | Sprague et al. | 260—240.65 |
| 2,622,082 | 12/1952 | Sprague et al. | 260—240.9 |
| 2,706,193 | 4/1955 | Sprague et al. | 260—240.4 |

OTHER REFERENCES

Stepanov et al., Angew. Chem., vol 71, page 125 (1959).
Stepanov et al., Zhur. Obsch. Khim., vol. 30 pages 2850 to 2854 (1960).
Saxton, J. Chem. Soc., 1951, pages 3240 to 3241.
Holland et al., J. Chem. Soc., 1955, pages 1657–1662.

JOHN D. RANDOLPH, *Primary Examiner.*

UNITED STATES PATENT OFFICE
CERTIFICATE OF CORRECTION

Patent No. 3,398,145                             August 20, 1968

Joseph Bailey

It is certified that error appears in the above identified patent and that said Letters Patent are hereby corrected as shown below:

Column 3, line 2, "I" should read -- Q --; line 21, "V" should read -- IV --. Column 4, lines 40 to 47, the formula should appear as shown below:

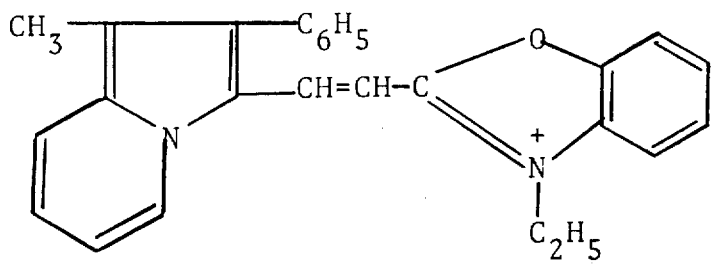

line 57, "7.1% C." should read -- 7.1% S.--. Column 5, lines 39 to 46, the portion of the formula reading:

-CH-           should read           -CH=

Column 6, lines 36 to 43, the lower left-hand portion of the formula reading

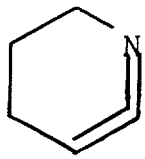       should read       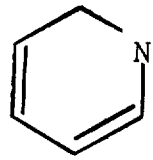

lines 60 to 63, the portion of the formula reading

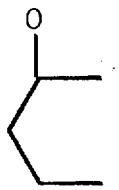                                          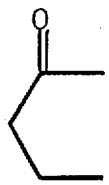

Column 7, lines 44 to 52, the upper left-hand portion of the formula reading

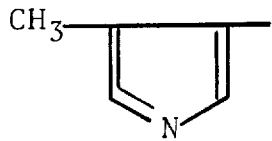   should read   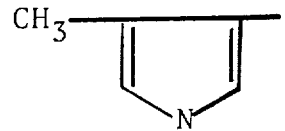

Column 8, lines 59 to 69, the portion of the formula reading

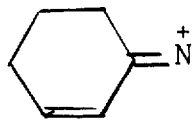   should read   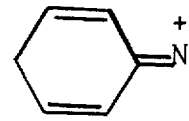

Column 9, lines 4 to 13, the portion of the formula reading

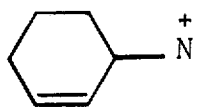   should read   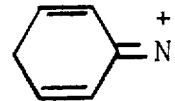

Column 10, line 17, "compoistion" should read -- composition --.
Column 11, line 30, "2,6675,316" should read -- 2,675,316 --;
line 36, "2,675,316, issued Apr. 13, 1954, prepared by
reacting" should read -- U. S. 2,548,564, issued Apr. 10, 1951,
including quaternary --. Column 13, line 4, "1.59" should read
-- 1.58 --.

Signed and sealed this 6th day of January 1970.

(SEAL)
Attest:

EDWARD M. FLETCHER, JR.
Attesting Officer

WILLIAM E. SCHUYLER, JR.
Commissioner of Patents